US008563642B2

(12) United States Patent
Buri et al.

(10) Patent No.: US 8,563,642 B2
(45) Date of Patent: Oct. 22, 2013

(54) PROCESS FOR DRY GRINDING OF ONE OR MORE MINERAL MATERIALS INCLUDING AT LEAST ONE CALCIUM CARBONATE

(75) Inventors: Matthias Buri, Rothrist (CH); Patrick A. C. Gane, Rothrist (CH); René Vinzenz Blum, St. Urban (CH)

(73) Assignee: Omya International AG, Oftringen (CH)

( * ) Notice: Subject to any disclaimer, the term of this patent is extended or adjusted under 35 U.S.C. 154(b) by 0 days.

(21) Appl. No.: 13/408,316

(22) Filed: Feb. 29, 2012

(65) Prior Publication Data

US 2012/0217327 A1 Aug. 30, 2012

Related U.S. Application Data

(62) Division of application No. 12/449,501, filed as application No. PCT/IB2008/000513 on Mar. 5, 2008, now Pat. No. 8,152,079.

(30) Foreign Application Priority Data

Mar. 5, 2007 (FR) ..................................... 07 01591

(51) Int. Cl.
*C08K 3/26* (2006.01)
*B02C 23/06* (2006.01)

(52) U.S. Cl.
USPC ........................................... 524/425; 241/16

(58) Field of Classification Search
USPC ....................................................... 524/425
See application file for complete search history.

(56) References Cited

U.S. PATENT DOCUMENTS

| | | | |
|---|---|---|---|
| 5,015,295 A * | 5/1991 | Lamond ........................ 106/464 |
| 7,470,739 B2 | 12/2008 | Gane et al. |
| 7,514,488 B2 | 4/2009 | Gane et al. |
| 7,825,192 B2 | 11/2010 | Gane et al. |
| 8,039,571 B2 | 10/2011 | Guerret et al. |
| 8,074,909 B2 | 12/2011 | Gane et al. |
| 8,080,595 B2 | 12/2011 | Gane et al. |
| 2003/0019399 A1 | 1/2003 | Malla et al. |
| 2004/0019148 A1 * | 1/2004 | Suau et al. ..................... 524/556 |
| 2006/0009560 A1 | 1/2006 | Gane et al. |
| 2006/0142498 A1 | 6/2006 | Gane et al. |
| 2007/0266898 A1 | 11/2007 | Gane et al. |
| 2007/0299183 A1 | 12/2007 | Gane et al. |
| 2009/0145987 A1 | 6/2009 | Gane et al. |
| 2009/0270543 A1 | 10/2009 | Mongoin et al. |
| 2009/0298988 A1 | 12/2009 | Jacquemet et al. |
| 2009/0312459 A1 | 12/2009 | Gane et al. |
| 2010/0120948 A1 | 5/2010 | Gane et al. |
| 2010/0222484 A1 | 9/2010 | Buri et al. |
| 2011/0105670 A1 | 5/2011 | Gane et al. |

FOREIGN PATENT DOCUMENTS

| | | |
|---|---|---|
| EP | 0296610 A2 | 12/1988 |
| EP | 0510890 A2 | 10/1992 |
| EP | 0610534 A1 | 8/1994 |
| EP | 1201624 A | 5/2002 |
| FR | 511274 A | 12/1920 |
| FR | 604609 A | 5/1926 |
| FR | 609535 A | 8/1926 |
| FR | 2203670 A1 | 5/1974 |
| FR | 2655875 A1 | 6/1991 |
| FR | 2863914 A1 | 6/2005 |
| GB | 2179268 A | 3/1987 |
| WO | 9109067 A2 | 6/1991 |
| WO | 9821158 A1 | 5/1998 |
| WO | 0077058 A1 | 12/2000 |
| WO | 0196007 A1 | 12/2001 |
| WO | 02081573 A1 | 10/2002 |
| WO | 2004041883 A1 | 5/2004 |
| WO | 2004044022 A | 5/2004 |
| WO | 2005026252 A1 | 3/2005 |
| WO | WO 2005026252 A1 * | 3/2005 |
| WO | 2005071003 A1 | 8/2005 |

OTHER PUBLICATIONS

International Search Report for PCT Application No. PCT/IB2008/000513.
Written Opinion of the International Searching Authority for PCT Application No. PCT/IB2008/000513.
English translation of the Examination Report for related Taiwanese Application No. 097197477, (2013).

* cited by examiner

*Primary Examiner* — Hui Chin
(74) *Attorney, Agent, or Firm* — Amster, Rothstein & Ebenstein LLP

(57) ABSTRACT

The present invention provides a process for dry grinding one or more mineral materials which include at least calcium carbonate. The process includes a) crushing the mineral material or materials in at least one crushing unit until a crushed material is obtained with a d95 of less than 10 cm, and dry grinding the material in at least one grinding unit (i) in the presence of at least one comb-type hydrophilic polymer containing at least polyalkylene oxide function grafted on to at least one unsaturated ethylene monomer, and (ii) in such a manner that the quantity of liquid in the grinding unit is less than 15% by dry weight of the material crushed in the crushing unit, wherein recovered material has a d50 of 0.5 to 500 microns.

16 Claims, No Drawings

PROCESS FOR DRY GRINDING OF ONE OR MORE MINERAL MATERIALS INCLUDING AT LEAST ONE CALCIUM CARBONATE

CROSS-REFERENCE TO RELATED APPLICATIONS

This application is divisional of U.S. patent application Ser. No. 12/449,501, filed on Oct. 19, 2009 now U.S. Pat. No. 8,152,079, which is a U.S. National Phase of PCT Application No. PCT/IB2008/000513, filed Mar. 5, 2008, which claims priority to French Application No. 07 01591, filed Mar. 5, 2007, the content of which is hereby incorporated by reference in its entirety.

A first object of the present invention is a process for dry grinding of one or more mineral materials which include at least one calcium carbonate, characterised in that the said process includes the stages of:
- a) crushing the mineral material or materials in at least one crushing unit until a crushed material is obtained with a $d_{95}$ of less than 10 cm;
- b) possibly improving all or part of the material crushed according to stage a);
- c) dry grinding the material crushed according to stage a) and/or b) in at least one grinding unit:
  - (i) in the presence of at least one comb-type hydrophilic polymer containing at least one polyalkylene oxide function grafted on to at least one unsaturated ethylene monomer,
  - (ii) in such a manner that the quantity of liquid in the said grinding unit is less than 15% by dry weight of the said material crushed in the said crushing unit;
- d) possibly classifying the material dry ground according to stage c) with at least one classification unit;
- e) possibly repeating stages c) and/or d) on all or part of the dry ground material resulting from stage c) and/or d);

and characterised in that the material recovered following stage c) and/or d) and/or e) has a $d_{50}$ (average diameter) of 0.5 to 500 microns.

Another object of the present invention is a product resulting from stages c) and/or d) and/or e) of the process according to the invention.

Another object of the present invention is the use of the product resulting from stages c) and/or d) and/or e) of the process according to the invention, in a process for grinding using a wet method, where the said wet grinding can take place in the possible presence of dispersing agents, in order to obtain a ground product with a $d_{50}$ (average diameter) of 0.4 to 1.0 microns, and preferentially in order to obtain a ground product with a $d_{50}$ (average diameter) of 0.6 to 0.9 microns.

In the whole of the present application, the term "hydrophilic" polymer designates a water-soluble or emulsified polymer in a copious quantity of water subjected to the force of a weak stirring.

In the whole of the present application, the expression "comb-type" polymer designates a polymer consisting of an essentially linear basic backbone, on to which are grafted at least 3 macromolecular lateral segments, where the term macromolecular designates a molecule of weight-average molecular weight (Mw) greater than 500 g/mole, among which at least one lateral segment consists of a polyalkaline oxide function grafted on to an unsaturated ethylene monomer. This or these "comb-type" polymer(s) may be homopolymers and/or copolymers and/or polymers of a higher order.

The said lateral segments are introduced into the polymer by polymerisation, possibly, without this being restrictive, of macromolecular monomers, i.e. of monomers of molecular weight greater than 500 g/mole, via an unsaturated ethylenic function located in one of the terminal positions of the said monomer.

In respect of the present invention, all the molecular weights (Mw) are the weight-average molecular weight determined according to the method explained below, by Stearic Exclusion Chromatography (CES).

1 ml of the polymer solution is put on a capsule, and then evaporated at ambient temperature in a vane pump vacuum. The solute is recovered by 1 ml of the eluent of the CES, and the whole is then injected in the CES equipment. The CES eluent is an aqueous $NaHCO_3$ solution: 0.05 mole/1, $NaNO_3$: 0.1 mole/L, triethylamine 0.02 mole/L, $NaN_3$ 0.03% by mass. The CES chain contains an isocratic pump (Waters™ 515) the flow rate of which is regulated at 0.5 ml/min., a kiln containing a precolumn of the "Guard Column Ultrahydrogel Waters™" type, a linear column measuring 7.8 mm internal diameter and 30 cm length of the "Ultrahydrogel Waters™" type, and a refractometric detector of the RI Waters™ 410 type. The kiln is heated to a temperature of 60° C. and the refractometer to 50° C. The chromatogram's detection and processing application is the SECential application, supplied by "L.M.O.P.S. CNRS, Chemin du Canal, Vernaison, 69277".

In the case of the comb-type hydrophilic polymers according to the invention, the CES is calibrated by a series of 5 sodium poly(acrylate) standards supplied by Polymer Standards Service™. In the case of the grinding agents EG, PEG and MPG, the CES is calibrated by a series of standard DIN polyethylene glycols available from the company Polymer Standards Service GmbH, Mayence, Germany, with the names: PSS-dpeg400, PSS-dpeg600, PSS-dpeg1k, PSS-dpeg1.5 k, PSS-dpeg2k, PSS-dpeg3k, PSS-dpeg4k, PSS-dpeg6k and PSS-dpeg10k.

Finally, in the whole of the present application, the value of "$d_x$" is the value for which X% by weight of the particles have a diameter lower than this value, as determined from the measurements made with a Malvern™ Mastersizer™ S granulometer version 2.8 for particle sizes of less than 100 microns, and by sieving for particle sizes greater than 100 microns.

The additives, introduced during the mineral materials grinding stage, are used to facilitate the grinding process, to assist the process of reducing the particle sizes, and to increase the capacity and efficiency of the grinding process. Such additives are known as grinding aid agents.

Unlike grinding aid agents which can be used for the grinding of mineral materials in a wet environment, using a liquid content greater than 15% by weight relative to the dry weight of mineral materials for grinding, and where this liquid habitually consists in the main of water, the grinding aid agents used for the grinding of such materials in a dry medium are subject to surface adsorption and desorption energies different to those for grinding agents able to be used in a wet medium. In addition, and among yet more differences, these dry grinding agents are specifically intended to be used in a possibly hydrophobic environment, such as air, as opposed to a hydrophilic environment, where wet medium grinding agents are generally used.

Dry grinding is generally accomplished in a grinder and results from an autogenous grinding operation, in which the particles for grinding are subjected to mutual impacts, or result from additional impacts with one or more other materials, such as grinding balls, grinding bars or grinding spindles. Such grinding may take place, for example, in a ball-mill, vibration grinder or wheel grinder. Depending on the type of grinding, the said grinding may take place in a stationary or rotary grinding chamber. The dry grinding agents may be added to the feed and/or into the grinding chamber and/or in the course of the grinding process.

A general discussion concerning dry grinding agents and their role during the grinding process may be found in "Beitrag zur Aufklärung der Wirkungsweise von Mahlhilfsmitteln" by K. Graichen et al. published in "Freiberger Forschungshefte" VEB Deutscher Verlag für Grundstoffindustrie, Leipzig, Germany (1975). There is another general article on the dry grinding of calcium carbonate: "Calcium Carbonate" by F. W. Tegethoff (Birkhäuser Verlag, 2001).

Generally speaking, dry grinding agents may be classified into one of the following 3 categories.

The first group of dry grinding aid agents of mineral materials which include a calcium carbonate traditionally consists of the weak Brönstedt acids, such as formic, acetic, lactic, lignitic, adipic or lactic acid, or the fatty acids, and in particular palmitic and stearic acid, and sulphonic lignine, or the salts of the weak Brönstedt acids, such as the sodium salts, and notably sodium lignine sulphonate, or sodium acetate.

In this context, document FR 2 863 914 describes the use of adipic acid during the dry grinding of a mineral material, with a view to preventing the subsequent re-agglomeration of the ground material, or the formation of dust during the grinding. However, such an acid limits the use of the ground material in products requiring a high electrical resistivity, such as flexible polymer cables, which are notably formed from polyethylene or PVC. Such additives are also used to increase the efficiency of the grinding in a specific fashion.

To this end, document FR 2 203 670 describes a dispersion agent for dry grinding in the form of aliphatic esters such as aliphatic acetates, which have the disadvantage that they are easily volatilised during the application of the ground products.

The salts of lignine sulphonates, which are commonly used in the cement industry, have the disadvantage that they decrease the resistivity of a polymer loaded with materials which have been dry ground by this agent, an undesirable consequence in the field of flexible cables.

Finally, document WO 98/21158 describes a method for the dry grinding of kaolins calcinated by the use of an ammonium polyacrylate as a dry grinding aid agent, with a view to improving the flowability of the ground product, the efficiency of the grinding and the rheological properties of the final product in which the products dry ground according to this invention are used.

A second group of dry grinding aid agents is constituted by the weak Brönstedt bases; this group notably includes the amines.

Illustrating the previous two groups, the skilled man in the art is familiar with document EP 0 510 890, which describes a device for the grinding solid particle materials, and more specifically inorganic materials, which can be carbonate-based materials, noticeably in the dry state, and also a process for grinding by attrition of such materials with the aim of distributing the grinding aid additive uniformly throughout the inorganic material. The treatment agent may be a fatty acid, and notably stearic acid, which is exemplified, an amine or a quaternary ammonium having at least one alkyl grouping, or a substituted silane. Conversely, it should be noted that a large majority of quaternary ammoniums are known to influence, and notably reduce the thermal stability of, PVC.

In addition, such additives are well known for their capacity to minimise the formation of aggregates of ground materials during or after the dry grinding process.

Document GB 2 179 268 describes a process for grinding of a material, which may include a carbonate, noticeably in the dry state. The additives introduced during this process with a view to minimising the formation of aggregates include short-chain and/or hydrophobic additives, notably the fatty acids, such as stearic acid (which is also exemplified), and fatty acid salts such as surfactants which are cationic in nature, such as amines, and specifically diamines (alkyl propylene diamine is exemplified), and silanes. Alkyls and ethoxylated alkyls phenyls are also described, and particularly octyl phenoxy polyethoxyethyl benzyl ether. Phosphate esters, metallic mono- or di-alcali salts of a copolymer of maleic anhydride and di-isobutylene are also mentioned. Finally, the sulfosuccinates are also described as able to be used in the process according to this document.

With regard to the two groups of dry grinding aid agents previously mentioned, document FR 2 863 914 reveals a marked disadvantage with regard to stearic acid: it does not enable ground particles of a diameter less than 25 µm to be obtained. In addition, it is known by the skilled man in the art that such fatty acids have a substantial influence on the surface tension of a particle, making it hydrophobic.

In respect of the amines and amine salts, it has been noted that in addition to the fact that they modify the electrical resistivity of the final product in which the dry ground material is found, such dry grinding aid agents may behave as chelating agents in the final applications in which they can be used, and notably relative to the cobalt-based compounds used during the manufacture of polyesters, which make it difficult to control the reactivity of the said polyester. In addition, in the case of the primary and secondary amines, it is possible to observe the formation of nitrogenous amines.

The Lewis bases constitute the third group of dry grinding aid agents, and notably contain the alcohols. Such alcohols are notably the ethylene glycols, diethylene glycols, triethylene glycols, propylene glycols and dipropylene glycols. For example, documents WO 2002/081 573 and US 2003/019 399 describe the use of diethylene glycol as a dry grinding aid agent in table 1 in each of these documents.

Document WO 2005/071 003 describes a calcium carbonate core at least partially covered by a layer added by means of two separate consecutive treatment stages, in which each stage implements a different treatment. The goal of this invention is to supply calcium carbonate particles having an improved dispersibility and a reduced tendency for agglomeration. This invention makes reference in a general way to a polyhydric alcohol, namely ethylene glycol, which constitutes the first and/or second treatment agent.

Certain of these additives are added with a view to improving the compatibility of the materials ground in the final application.

To this end, the skilled man in the art is familiar with document WO 2005/026 252, which describes a surface-modified load comprising particular loads, which can, among other alternatives, be calcium carbonate, in which the surfaces of this load are modified with a multiplicity of hydroxyl groupings. Such loads can be made compatible and dispersible in polymeric resins. If the said load is a natural calcium carbonate the document indicates that the said natural calcium carbonate is preferentially modified by dry grinding in the absence of hygroscopic or hydrophilic chemical species. The dry grinding aid agent may be a triethanolamine, a polypropylene glycol or an ethylene glycol.

In fact, grinding aid agents of the mono- or pluri glycol type, of molecular weight generally less than 300 g/mole, are frequently used in industry, and have many advantages, including their low cost.

However, on the subject of these types of grinding aid agents, it has been remarked that products ground by such agents have a relatively high quantity of volatile organic compounds (VOCs), and thus do not meet the obligations in respect of environmental pollution.

The skilled man in the art must therefore face the following problem: to reduce the size of the particles of one or more mineral materials which each include at least one calcium carbonate by dry grinding enabling a particle with an average diameter to be obtained, as sought in most fields of application of such a particle, and notably in order to obtain a ground material with a $d_{50}$ (average diameter) of 0.5 to 500 microns, without introducing a high quantity of volatile organic compounds (VOCs) into the ground product.

In addition, this solution must not use quantities of grinding aid agents which could substantially alter the properties of the ground material, or the properties of the final product containing the said ground material.

In answer to these questions, the Applicant has developed a process which resolves surprisingly all the problems mentioned above.

This is a process for dry grinding of one or more mineral materials which include at least one calcium carbonate, characterised in that the said process includes the stages of:
  a) crushing the mineral material or materials in at least one crushing unit until a crushed material is obtained with a $d_{95}$ of less than 10 cm;
  b) possibly improving all or part of the material crushed according to stage a);
  c) dry grinding the material crushed according to stage a) and/or b) in at least one grinding unit:
    (i) in the presence of at least one comb-type hydrophilic polymer containing at least one polyalkylene oxide function grafted on to at least one unsaturated ethylene monomer,
    (ii) in such a manner that the quantity of liquid in the said grinding unit is less than 15% by dry weight of the said material crushed in the said crushing unit;
  d) possibly classifying the material dry ground according to stage c) with at least one classification unit;
  e) possibly repeating stages c) and/or d) on all or part of the dry ground material resulting from stage c) and/or d);
and characterised in that the material recovered following stage c) and/or d) and/or e) has a $d_{50}$ (average diameter) of 0.5 to 500 microns.

Thus, the Applicant can cite document EP 0 610 534, which teaches the preparation of polymers obtained by copolymerisation of an isocynate monomer and aprotic monomers, followed by functionalisation by means of monoalkylated amines or ethers of glycol polyalkylenes. Such agents are particularly effective for the aqueous grinding of organic pigments.

Similarly, they indicate that document WO 00/077 058 describes polymers based on an unsaturated derivative of a mono- or dicarboxylic acid, on an unsaturated derivative with a comb structure, of an unsaturated polysiloxane compound or of an unsaturated ester. These copolymers are used as dispersing agents in aqueous suspensions of mineral fillers, notably in the cements sector.

Document WO 91/09067 describes water-soluble amphoteric agents with an ethylenic monomer base and a carboxylic function, with a non-ionic ethylenic monomers base and cationic ethylenic monomers base, the cationic grouping of which is separated from the ethylenic chain by means of oxyalkylated groups, and bearing at least two alkyl radicals. These agents are used, without this being restrictive, in grinding in an aqueous phase of pigments and/or mineral fillers.

There are also familiar with document WO 01/096 007, which describes an ionic, water-soluble copolymer having a grafted alkoxy or hydroxy function with a comb structure, the role of which is to disperse and/or assist with the grinding of the pigments and/or of the mineral fillers in an aqueous medium. The said copolymer enables aqueous suspensions of the said refined materials to be obtained, with a dry matter concentration which may be high, with a Brookfield™ viscosity which is low and stable over time, and which has the property that it has a pigment surface the ionic charge of which, determined by titration, is low: this is therefore a technical problem different from the one which the present invention seeks to resolve.

They are also familiar with document WO 2004/041 883, which teaches the use of a water-soluble copolymer, preferably weakly ionic and water-soluble, having at least one alkoxy or hydroxy function with a comb structure grafted on to at least one unsaturated ethylene monomer, as an agent improving the brightness of the final product such as a sheet of paper or a plastic.

It would appear through a reading of this document that the said copolymer can be used in a process which can, without this being restrictive, be a process for grinding in an aqueous medium (examples 1, 2, 6), and that it is the resulting dispersion or suspension which gives the final product (paint or coated sheet of paper in examples 1, 2, 3, 4, 6 and 7) an improved brilliance. The said copolymer can also be used as a direct additive, but in a wet medium, in the case of the formulation of a paper coating, the said coating subsequently giving the coated sheet of paper an improved brilliance (example 5). The technical problem resolved by this document is thus very different from the one forming the subject of the present application.

Finally the Applicant is also familiar with document WO 2004/044 022, which describes the use of a water-soluble copolymer having at least one alkoxy or hydroxy function with a comb structure grafted on to at least one unsaturated ethylene monomer, as an agent improving the activation of optical brightening in the paper, textile, detergent and paint fields. It should be noted that activation of optical azuring is a property far removed from those forming the subject of the present application.

The Applicant is also familiar with unpublished patent application FR 05 11274, which firstly concerns a process to manufacture a thermoplastic resin charged with mineral or carbonated matter, and possibly containing an organic impact modifier, through the introduction into the said resin of a comb polymer with at least one unsaturated ethylene monomer, on to which is grafted at least one polyalkylene oxide function. This patent application does not make reference to dry grinding of one or more mineral materials which include at least one calcium carbonate, characterised in that the said process includes the multiple stages of the present invention. Similarly, test n° 16 of this patent application makes use of a polymer according to this patent application only after a stage of dry grinding with a monopropylene glycol.

Finally, the Applicant is also familiar with unpublished patent application FR 06 09535, which firstly concerns the use as a compatibilising agent, in a process to manufacture a chlorinated thermoplastic resin loaded with a mineral material, of a comb polymer having at least one anionic unsaturated ethylene monomer, on to which is grafted at least one polyalkylene oxide function. This patent application does not make reference to dry grinding of one or more mineral materials which include at least one calcium carbonate, characterised in that the said process includes the multiple stages of the present invention.

Thus, none of these documents of the prior art concerns the following problem which the skilled man in the art must resolve: to achieve grinding and division of one or more mineral materials which each include at least one calcium carbonate through a dry grinding process, without leading to a product with an excessively high quantity of volatile organic compounds (VOCs).

More specifically, none of the documents of the prior art describes or teaches the resolution of this problem, in combination with the other requirements of the skilled man in the art, namely:

to provide an efficient process for grinding (in terms of production capacity and required grinding energy) of one or more mineral materials which each include at least one calcium carbonate, leading to an average diameter as sought in most of the diverse fields of application of such ground materials (0.5 to 500 microns), particularly compared with the solutions of the prior art, to avoid the use of quantities of grinding aid agents which might alter the properties of the end product, in order to accomplish efficient grinding, to avoid the use of a grinding aid agent which behaves as a complexing agent during the manufacture of polyesters, consequently making the speed of reaction difficult to control, to supply a grinding aid agent which will lead to a reduced quantity of volatile organic compounds (VOCs) in the ground product, in order to meet the obligations relative to environmental pollution.

With regard to this latter requirement, it should be noted that even with low vapour pressures of the order of $10^{-2}$ mm Hg and with boiling points of the order of 250° C. or more, most of the glycols used in the prior art as dry grinding aid agents can evaporate completely, even at low temperatures of the order of 45° C., during a period of approximately 16 hours.

It will notably be important to supply a grinding aid agent which does not lead to the formation of azeotropes in combination with the aqueous and/or alcohol and/or organic solvents, which are media in which the ground product might be found, since azeotropes have a high risk of environmental contamination.

The Applicant is keen to indicate that they are familiar with unpublished patent application FR 06 04690, which covers a similar problem to the problem resolved by the present invention. The solution of unpublished patent application FR 06 04690 concerns a process for dry grinding of a material containing a carbonated ore, characterised in that the said process includes, without this being restrictive, a stage of dry grinding of this material in the presence of at least one polyalkylene glycol polymer, in which at least 90% of the monomer units forming the backbone of the said polymer consist of ethylene oxide, propylene oxide, or combinations of them, and the molecular weight of which is at least equal to 400 g/mole. This patent application makes no reference to the use of comb-type hydrophobic polymers as a dry grinding aid agents.

As mentioned previously, a first object of the present invention consists of a process for dry grinding of one or more mineral materials which include at least one calcium carbonate, characterised in that the said process includes the stages of:

a) crushing the mineral material or materials in at least one crushing unit until a crushed material is obtained with a $d_{95}$ of less than 10 cm;
b) possibly improving all or part of the material crushed according to stage a);
c) dry grinding the material crushed according to stage a) and/or b) in at least one grinding unit:
   (i) in the presence of at least one comb-type hydrophilic polymer containing at least one polyalkylene oxide function grafted on to at least one unsaturated ethylene monomer,
   (ii) in such a manner that the quantity of liquid in the said grinding unit is less than 15% by dry weight of the said material crushed in the said crushing unit;
d) possibly classifying the material dry ground according to stage c) with at least one classification unit;
e) possibly repeating stages c) and/or d) on all or part of the dry ground material resulting from stages c) and/or d);
and characterised in that the material recovered following stage c) and/or d) and/or e) has a $d_{50}$ (average diameter) of 0.5 to 500 microns.

Concerning the present invention, the said crushing stage a) does not make use of a comb-type hydrophilic polymer containing at least one polyalkylene oxide function grafted on to at least one unsaturated ethylene monomer.

A crushing stage, such as the one implemented in stage a) of the present invention, is distinguished from a grinding stage, such as the one implemented in stage c) of the present invention, in that crushing is an essentially coarse combination, generally leading to fragments being obtained with an average diameter of the order of one centimetre, or one millimetre, whereas grinding consists of a fragmentation operation leading to a substantially finer product than the crushed product, of an average diameter of 0.5 to 500 microns.

The process according to the invention is also characterised in that at least one of the crushing units of stage a) is a hammer mill and/or an autogenous crushing unit.

In stage a), the process according to the invention is also characterised in that the quantity of liquid in the said crushing unit is less than 15%, and is preferentially less than 10%, by dry weight of the said mineral material(s) in the said crushing unit.

Stage a) of the process according to the invention is also characterised in that the said mineral material(s) are crushed until a crushed material is obtained with a $d_{95}$ of less than 30 mm, and preferentially less than 5 mm.

In an embodiment, the process according to the invention is characterised in that stage b) takes place, i.e. that all or part of the material crushed according to stage a) is improved. This improvement stage, which is a stage of purification of all or part of the material crushed according to stage a), can notably take place through a flotation and/or magnetic separation and/or sieving stage and/or a stage of chemical treatment, such as an oxydative or reductive whitening treatment.

Concerning stage c) of the process according to the invention, the polymer(s) used according to the invention are obtained by processes of radical polymerisation in solution, in a direct or reverse emulsion, in suspension or in precipitation in appropriate solvents, in the presence of known catalytic systems and transfer agents, or again by controlled radical polymerisation processes such as the method by the name of Reversible Addition Fragmentation Transfer (RAFT), the method by the name of Atom Transfer Radical Polymerization (ATRP), the method by the name of Nitroxide Mediated Polymerization (NMP) or again the method by the name of Cobaloxime Mediated Free Radical Polymerization.

This or these polymer(s) may possibly be distilled in order to eliminate all solvents present during the polymerisation.

The process according to the invention is also characterised in that in stage c), i.e. in the dry grinding stage, the unsaturated ethylene monomers within the comb-type hydrophilic polymer(s) and on to which at least one polyalkylene oxide function is grafted, each have a weight-average molecular weight (Mw) of between 500 and 20,000 g/mole.

In an embodiment of the process according to the invention the unsaturated ethylene monomers used in stage c) are non-ionic and/or anionic.

The process according to the invention is also characterised in that in stage c) only one polyalkylene oxide function is grafted on to the said unsaturated ethylene monomer(s).

In another embodiment of the process according to the invention, in stage c), at least one of the unsaturated ethylene monomers on to which at least one polyalkylene oxide function is grafted is a monomer of formula (I):

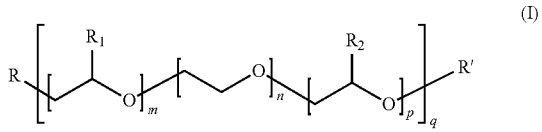

where:
- m and p represent a number of alkylene oxide units less than or equal to 125
- n represents a number of ethylene oxide groups of less than or equal to 125,
- q represents a whole number at least equal to 1 and such that $12 \leq (m+n+p)q \leq 450$, and preferentially such that $25 \leq (m+n+p)q \leq 140$,
- $R_1$ represents hydrogen or the methyl or ethyl radical,
- $R_2$ represents hydrogen or the methyl or ethyl radical,
- R represents a radical containing an unsaturated polymerisable function, preferentially belonging to the group of vinylics, or to the group of acrylic, methacrylic, maleic, itaconic, crotonic or vinylphthalic esters, or to the group of unsaturated urethanes such as, for example, acrylurethane, methacrylurethane, α-α' dimethyl-isopropenyl-benzylurethane, allylurethane, or to the group of allylic or vinylic ethers, whether or not substituted, or again to the group of ethylenically unsaturated amides or imides,
- R' represents hydrogen or a hydrocarbonated radical having 1 to 22, and preferentially 8 to 18, carbon atoms, or an ionic or ionisable grouping such as a phosphate, a phosphonate, a sulphate, a sulphonate, a carboxylic, or indeed a primary, secondary or tertiary amine, or indeed their blends.

The process according to the invention is also characterised in that, in stage c), at least three of the said unsaturated ethylene monomers on to which are grafted at least one polyalkylene oxide function are monomers of formula (I):

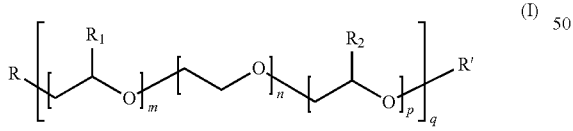

where:
- m and p represent a number of alkylene oxide units less than or equal to 125
- n represents a number of ethylene oxide groups of less than or equal to 125,
- q represents a whole number at least equal to 1 and such that $12 \leq (m+n+p)q \leq 450$, and preferentially such that $25 \leq (m+n+p)q \leq 140$,
- $R_1$ represents hydrogen or the methyl or ethyl radical,
- $R_2$ represents hydrogen or the methyl or ethyl radical,
- R represents a radical containing an unsaturated polymerisable function, preferentially belonging to the group of vinylics, or to the group of acrylic, methacrylic, maleic, itaconic, crotonic or vinylphthalic esters, or to the group of unsaturated urethanes such as, for example, acrylurethane, methacrylurethane, α-α' dimethyl-isopropenyl-benzylurethane, allylurethane, or to the group of allylic or vinylic ethers, whether or not substituted, or again to the group of ethylenically unsaturated amides or imides,
- R' represents hydrogen or a hydrocarbonated radical having 1 to 22, and preferentially 8 to 18, carbon atoms, or an ionic or ionisable grouping such as a phosphate, a phosphonate, a sulphate, a sulphonate, a carboxylic, or indeed a primary, secondary or tertiary amine, or indeed their blends.

The process according to the invention is also characterised in that in stage c) the comb-type hydrophilic polymer(s) consist:

a) of at least one anionic unsaturated ethylene monomer with a monocarboxylic or dicarboxylic or phosphoric or phosphonic or sulphonic function, or their blends, b) of at least one monomer of formula (I):

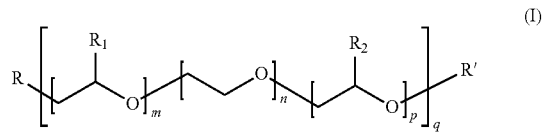

where:
- m and p represent a number of alkylene oxide groups of less than or equal to 125,
- n represents a number of ethylene oxide groups of less than or equal to 125,
- q represents a whole number at least equal to 1 and such that $12 \leq (m+n+p)q \leq 450$, and preferentially such that $25 \leq (m+n+p)q \leq 140$,
- $R_1$ represents hydrogen or the methyl or ethyl radical,
- $R_2$ represents hydrogen or the methyl or ethyl radical,
- R represents a radical containing an unsaturated polymerisable function, preferentially belonging to the group of vinylics, or to the group of acrylic, methacrylic, maleic, itaconic, crotonic or vinylphthalic esters, or to the group of unsaturated urethanes such as, for example, acrylurethane, methacrylurethane, α-α' dimethyl-isopropenyl-benzylurethane, allylurethane, or to the group of allylic or vinylic ethers, whether or not substituted, or again to the group of ethylenically unsaturated amides or imides,
- R' represents hydrogen or a hydrocarbonated radical having 1 to 22, and preferentially 8 to 18, carbon atoms, or an ionic or ionisable grouping such as a phosphate, a phosphonate, a sulphate, a sulphonate, a carboxylic, or indeed a primary, secondary or tertiary amine, or indeed their blends, and preferentially represents a hydrocarbonated radical having 1 to 12 carbon atoms, and very preferentially a hydrocarbonated radical having 1 to 4 carbon atoms.

or a blend of several monomers of formula (I), c) possibly at least one monomer of the acrylamide or methacrylamide type or their derivatives such as N-[3-(dimethylamino)propyl]acrylamide or N-[3-(dimethylamino) propyl]methacrylamide, and their blends, or indeed at least one non-water-soluble monomer such as the alkyl acrylates or methacrylates, the unsaturated esters such as N-[2-(dimethylamino)ethyl]methacrylate, or N-[2-(dimethylamino)ethyl]acrylate, the vinylics such as vinyl acetate, vinylpyrrolidone, styrene, alphamethylstyrene and their derivatives.

The process according to the invention is also characterised in that in stage c) the said comb-type hydrophilic polymer(s) consist:

a) of at least one anionic unsaturated ethylene monomer chosen from among the unsaturated ethylene monomers and with a monocarboxylic function such as acrylic or methacrylic acid, or again the diacid hemiesters such as the $C_1$ to $C_4$ monoesters of maleic or itaconic acids, or their blends, or chosen from among the unsaturated ethylene monomers with a dicarboxylic function such as crotonic, isocrotonic, cinnamic, itaconic, maleic acid, or again the anhydrides of carboxylic acids, such as maleic anhydride, or chosen from among the unsaturated ethylene monomers with a sulphonic function such as acrylamido-methyl-propane-sulphonic acid, sodium methallylsulphonate, vinyl sulphonic acid and styrene sulphonic acid, or again chosen from among the unsaturated ethylene monomers with a phosphoric function such as vinyl phosphoric acid, ethylene glycol methacrylate phosphate, propylene glycol methacrylate phosphate, ethylene glycol acrylate phosphate, or again chosen from among the unsaturated ethylene monomers with a phosphonic function such as vinyl phosphonic acid, or their blends, b) of at least one unsaturated ethylene monomer of formula (I):

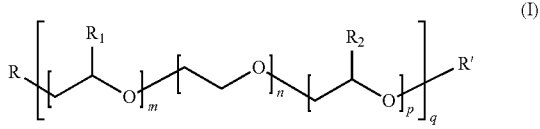

where:
- m and p represent a number of alkylene oxide groups of less than or equal to 125,
- n represents a number of ethylene oxide groups of less than or equal to 125,
- q represents a whole number at least equal to 1 and such that $12 \leq (m+n+p)q \leq 450$, and preferentially such that $25 \leq (m+n+p)q \leq 140$,
- $R_1$ represents hydrogen or the methyl or ethyl radical,
- $R_2$ represents hydrogen or the methyl or ethyl radical,
- R represents a radical containing an unsaturated polymerisable function, preferentially belonging to the group of vinylics, or to the group of acrylic, methacrylic, maleic, itaconic, crotonic or vinylphthalic esters, or to the group of unsaturated urethanes such as, for example, acrylurethane, methacrylurethane, α-α' dimethyl-isopropenyl-benzylurethane, allylurethane, or to the group of allylic or vinylic ethers, whether or not substituted, or again to the group of ethylenically unsaturated amides or imides,
- R' represents hydrogen or a hydrocarbonated radical having 1 to 22, and preferentially 8 to 18, carbon atoms, or an ionic or ionisable grouping such as a phosphate, a phosphonate, a sulphate, a sulphonate, a carboxylic, or indeed a primary, secondary or tertiary amine, or indeed their blends, and preferentially represents a hydrocarbonated radical having 1 to 12 carbon atoms, and very preferentially a hydrocarbonated radical having 1 to 4 carbon atoms, or a blend of several monomers of formula (I).

c) possibly at least one monomer of the acrylamide or methacrylamide type or their derivatives such as N-[3-(dimethylamino)propyl]acrylamide or N-[3-(dimethylamino) propyl]methacrylamide, and their blends, or indeed at least one non-water-soluble monomer such as the alkyl acrylates or methacrylates, the unsaturated esters such as N-[2-(dimethylamino)ethyl]methacrylate, or N-[2-(dimethylamino) ethyl]acrylate, the vinylics such as vinyl acetate, vinylpyrrolidone, styrene, alphamethylstyrene and their derivatives.

The process according to the invention is also characterised in that in stage c) the said comb-type hydrophilic polymer(s) consist, expressed by weight:

a) of 1% to 15% and even more specifically of 2% to 10% of at least one anionic unsaturated ethylene monomer chosen from among the unsaturated ethylene monomers and with a monocarboxylic function such as acrylic or methacrylic acid, or again the diacid hemiesters such as the $C_1$ to $C_4$ monoesters of maleic or itaconic acids, or their blends, or chosen from among the unsaturated ethylene monomers with a dicarboxylic function such as crotonic, isocrotonic, cinnamic, itaconic, maleic acid, or again the anhydrides of carboxylic acids, such as maleic anhydride, or chosen from among the unsaturated ethylene monomers with a sulphonic function such as acrylamido-methyl-propane-sulphonic acid, sodium methallylsulphonate, vinyl sulphonic acid and styrene sulphonic acid, or again chosen from among the unsaturated ethylene monomers with a phosphoric function such as vinyl phosphoric acid, ethylene glycol methacrylate phosphate, propylene glycol methacrylate phosphate, ethylene glycol acrylate phosphate, or again chosen from among the unsaturated ethylene monomers with a phosphonic function such as vinyl phosphonic acid, or their blends, b) 80% to 99%, and even more particularly 90% to 98%, of at least one unsaturated ethylene monomer of formula (I):

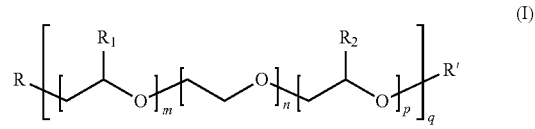

where:
- m and p represent a number of alkylene oxide groups of less than or equal to 125,
- n represents a number of ethylene oxide groups of less than or equal to 125,
- q represents a whole number at least equal to 1 and such that $12 \leq (m+n+p)q \leq 450$, and preferentially such that $25 \leq (m+n+p)q \leq 140$,
- $R_1$ represents hydrogen or the methyl or ethyl radical,
- $R_2$ represents hydrogen or the methyl or ethyl radical,
- R represents a radical containing an unsaturated polymerisable function, preferentially belonging to the group of vinylics, or to the group of acrylic, methacrylic, maleic, itaconic, crotonic or vinylphthalic esters, or to the group of unsaturated urethanes such as, for example, acrylurethane, methacrylurethane, α-α' dimethyl-isopropenyl-benzylurethane, allylurethane, or to the group of allylic or vinylic ethers, whether or not substituted, or again to the group of ethylenically unsaturated amides or imides,
- R' represents hydrogen or a hydrocarbonated radical having 1 to 22, and preferentially 8 to 18, carbon atoms, or an ionic or ionisable grouping such as a phosphate, a phosphonate, a sulphate, a sulphonate, a carboxylic, or indeed a primary, secondary or tertiary amine, or indeed their blends, and preferentially represents a hydrocarbonated radical having 1 to 12 carbon atoms, and very preferentially a hydrocarbonated radical having 1 to 4 carbon atoms, or a blend of several monomers of formula (I), c) 0% to 50% of at least one monomer of the acrylamide or methacrylamide type or their derivatives such as N-[3-(dimethylamino)propyl]acrylamide or N-[3-(dimethylamino) propyl]methacrylamide, and their blends, or indeed at least one non-water-soluble monomer such as the alkyl acrylates or methacrylates, the unsaturated esters such as N-[2-(dimethylamino)ethyl]methacrylate, or N-[2-(dimethylamino)ethyl]acrylate, the vinylics such as vinyl acetate, vinylpyrrolidone, styrene, alphamethylstyrene and their derivatives, where the total proportions of the constituents a), b) and c) are equal to 100%.

When the ethylenically unsaturated anionic monomers are ethylenically unsaturated anionic monomers with a monocarboxylic or dicarboxylic function and $R_1$, $R_2$ and R' represent hydrogen in the unsaturated ethylene monomer(s) of formula (I), stage c) of the process according to the invention is also characterised in that the molar ratio of the unsaturated ethylene monomer(s) of formula (I) relative to the ethylenically unsaturated anionic monomers with a monocarboxylic or dicarboxylic function in the comb-type hydrophilic polymer(s) is 2:3 to 1:2 in the case in which (m+n+p)q is 50 to 100, 1:2 to 1:4 in the case in which (m+n+p)q is 25 to 50, and 1:4 to 1:10 in the case in which (m+n+p)q is 12 to 25.

In another embodiment, stage c) of the process according to the invention is also characterised in that when the ethylenically unsaturated anionic monomer(s) are ethylenically unsaturated anionic monomers with a monocarboxylic or dicarboxylic function and the unsaturated ethylene monomer(s) of formula (I) are ethylene oxide methacrylate esters where (m+n+p)q is 40 to 130, the molar ratio of the unsaturated ethylene monomer(s) of formula (I) relative to the ethylenically unsaturated anionic monomers with a monocarboxylic or dicarboxylic function in the comb-type hydrophilic polymer(s) is 1:2.

This or these polymer(s) obtained in the acid form may also be partially or totally neutralised by one or more neutralisation agents having a monovalent neutralising function or a polyvalent neutralising function such as, for example, for the monovalent function, those chosen from the group constituted by the alkaline cations, in particular sodium, potassium, lithium, ammonium or the primary, secondary or tertiary aliphatic and/or cyclic amines, such as, for example, stearylamine, the ethanolamines (mono-, di-, triethanolamine), mono- and diethylamine, cyclohexylamine, methylcyclohexylamine, amino methyl propanol, or again, for the polyvalent function, those chosen from the group constituted by the alkaline earth divalent cations, in particular magnesium and calcium, or again zinc, and also by the trivalent cations, in particular aluminium, or again by certain cations of higher valency.

Each neutralisation agent then acts with neutralisation rates inherent to each valency function.

The Applicant wishes to stress that the said comb-type hydrophilic polymer(s), when they are used according to the process of the invention, can be in the state of a dry powder or in the liquid state, i.e. in the form of an emulsion or an aqueous suspension, and that preferentially the said comb-type hydrophilic polymer(s) are used in the liquid state. The skilled man in the art will know how to use such comb-type hydrophilic polymer(s) in the liquid state such that the quantity of liquid in the said grinding unit is less than 15% by dry weight of the said material in the said grinding unit.

According to another embodiment, the comb-type hydrophilic polymer(s) are treated and separated into several phases by one or more polar solvents belonging notably to the group constituted by water, methanol, ethanol, propanol, isopropanol, the butanols, acetone, tetrahydrofuran or their blends, before their use in stage c).

In this case this or these comb-type hydrophilic polymer(s) are distilled in order to eliminate the solvent present during this fractionation, before they are used in stage c).

With regard to the comb-type hydrophilic polymer(s) used during stage c) of the process, the invention can also be characterised in that the said comb-type hydrophilic polymer(s) each have a weight-average molecular weight (Mw) of 1,800 to 100,000 g/mole, and preferentially 20,000 to 50,000 g/mole.

Concerning the quantity of the comb-type hydrophilic polymer(s) used in the present invention, this quantity must be determined by the skilled man in the art in accordance with the final goal in terms of particle size. However, it can be advantageous to use 0.005 to 1.0% by dry weight, and preferentially 0.03 to 0.5% by dry weight, of comb-type hydrophilic polymer relative to the dry weight of the material crushed in each grinding unit.

According to another embodiment, the process according to the present invention can be implemented such that the quantity of the comb-type hydrophilic polymer(s) used in each grinding unit is between 0.1 and 1 mg of comb-type hydrophilic polymer per $m^2$ of recovered material, and preferentially between 0.2 and 0.6 mg of comb-type hydrophilic polymer per $m^2$ of recovered material.

Additionally, it can be advantageous to use at least one comb-type hydrophilic polymer characterised in that, when it is subjected to a temperature of 45° C. for a period of 16 hours, more than 75%, and preferentially more than 90%, of 50 mg of the comb-type hydrophilic polymer(s) placed in 50 ml of water is not volatilised.

The various forms of the comb-type hydrophilic polymer(s) according to the process of the present invention can be blended together so as to form a blend of at least two comb-type hydrophilic polymers able to be used in stage c) of the process of the present invention.

The various forms of the comb-type hydrophilic polymer(s) used in the process of the present invention can also be blended with agents which are not of the comb type, before or during stage c) of the process. In this case it is preferable that the said comb-type hydrophilic polymer should represent at least 50% by weight, and preferentially at least 85% by weight, and very preferentially at least 95% by weight, of the total weight constituted by the comb-type hydrophilic polymer(s) and of the agents which are not of the comb type.

In a particular embodiment of the present invention, the agent which is not of the comb type is a carbohydrate, a polyethylene glycol (PEG), tri isopropanol amine (TIPA), or their blends.

The said PEG can be used advantageously in combination with a comb-type hydrophilic polymer of molecular weight of between 500 and 10,000, and preferentially 1,000 to 8,000 g/mole, and in a ratio PEG: comb-type hydrophilic polymer equal to 50:50.

The said TIPA can be used advantageously in combination with a comb-type hydrophilic polymer in a ratio TIPA: comb-type hydrophilic polymer equal to 20:80.

The said carbohydrate can be a sucrose, a sorbitol, or their blends.

The process according to the present invention can be implemented particularly for a material which includes at least 80%, and preferentially at least 90%, by weight of calcium carbonate relative to the weight of the said material in the said grinding unit.

Regarding the calcium carbonate, this can be limestone, a marble, a chalk, a dolomite or their blends, and is preferentially a limestone, a marble or their blends.

The non-calcium carbonate part of the material in the said grinding unit can consist of a clay, a non-clayey silicate, silicon dioxide, or their blends. Preferentially, this clay can be a bentonite, a kaolin, a feldspar, a calcinated clay or their blends, and this non-clayey silicate is a talc, a mica or their blends.

In the process according to the invention, the quantity of liquid in the grinding unit is lower than 15%, preferentially lower than 10%, and more preferentially lower than 5%, and yet more preferentially lower than 1%, by weight, relative to the total dry weight of the material for grinding in the said grinding unit. This quantity of liquid is determined by the loss of weight observed when the ground material in the grinding unit is heated in a kiln to 120° C. until a constant weight is obtained; the loss of weight expressed as a percentage of the initial weight of the original material indicates the liquid content.

The liquid in the grinding unit may contain water and/or one or more organic solvents and/or one or more additives in the liquid state. According to an embodiment of the invention, this liquid contains at least 60%, and preferentially at least 70%, by weight of water relative to the weight of the liquid.

Concerning the grinding units used during stage c), they can consist of at least one wheel grinder with grinding wheels and/or at least one ball-mill with grinding balls and/or a spindle grinder. With regard to the said units, it can be advantageous to use a peripheral speed of between 5 and 60 m/s, and preferentially of between 20 and 40 m/s. The temperature reached in the grinding units used during stage c) is generally between 5 and 150° C., and more particularly between 50 and 110° C.

In the case of a ball-mill, the grinding balls which are present in it have a Brinell hardness of between 510 and 600. Preferentially they are made of iron, such as iron-based alloys with molybdenum or chromium, porcelain and/or silicates, and they have an average ball diameter of between 5 and 50 mm, and preferentially of between 15 and 25 mm. In a preferred aspect of the present invention these grinding balls have an aspect ratio (length/diameter ratio) of between 1/3 and 3/1. In certain cases it can be advantageous to use grinding balls having a bimodal distribution of diameters.

According to another preferred aspect, these grinding balls are present in a volume ratio relative to the material for grinding contained in the ball-mill of between 1.8:1 and 3.6:1, and this ratio is preferentially equal to 2.5:1.

Stage c) of dry grinding of the process according to the present invention can also be followed by one or more classification stages d).

If at least 2 classification stages take place before any subsequent stage c), one or other of these 2 stages can take place in series or in parallel.

This classification can notably take place in a cyclone-type and/or rotor-type classifier. It is then preferable that the ascending flow of the conveyance gas of this classification unit, which is preferentially air, has a speed of between 3 and 15 m/s, and preferentially of between 8 and 12 m/s.

In certain cases it can be advantageous to have a part of the material resulting from the classification stage d) recirculated back into stage c) for additional grinding. This is notably the case for classified particles having an average diameter outside the range required for the ground materials of the present invention, called "recovered materials". It may be advantageous if the recovered materials according to the present invention have a $d_{50}$ (average diameter) of between 0.7 and 150 microns, preferentially of between 1 and 45 microns, and more preferentially of between 1.2 and 5 microns.

If the recovered materials are extracted following the classification stage and if the remaining materials are reintroduced into stage c), it may be advantageous to add a fresh quantity of crushed material equal to the quantity of recovered material resulting from stage d) into stage c), with a view to maintaining a constant weight of material in the grinding unit.

Another object of the invention consists in the products characterised in that they are obtained by the process according to the present invention.

Another object of the present invention is the use of the product resulting from stages c) and/or d) and/or e) of the process according to the invention, in a process for grinding using a wet method, where the said wet grinding can take place in the possible presence of dispersing agents, in order to obtain a ground product with a $d_{50}$ (average diameter) of 0.4 to 1.0 microns, and preferentially in order to obtain a ground product with a $d_{50}$ (average diameter) of 0.6 to 0.9 microns.

EXAMPLES

The following examples are non-restrictive and are here with the aim of illustrating certain aspects of the present invention; they can in no way limit the scope of the present invention.

Measurement Method

The granulometric characteristics measured in the following examples are determined using measurements made with a Malvern™ Mastersizer™ S granulometer version 2.8 for particle sizes lower than 100 microns, and by sieving for particle sizes greater than 100 microns.

Grinding Aid Agents

The grinding aid agents referenced PEG 6000 consist of polyethylene glycol with a molecular weight of 6,000 g/mole, and were obtained from the company FLUKA™

The grinding aid agents referenced MPG consist of 1,2-propanediol, and were obtained from the company FLUKA™.

The grinding aid agents referenced EG consist of ethylene glycol, and were obtained from the company FLUKA™

The grinding aid agents referenced PP1 consist of a polymer formed by radical polymerisation of 14.0% molar of polyethylene glycol methacrylate of molecular weight 2,000 g/mole, 66.0% molar of acrylic acid and 20.0% molar of maleic acid, and have a molecular weight of 45,300 g/mole.

The grinding aid agents referenced PP2 consist of a polymer formed by radical polymerisation of 27.4% molar of polyethylene glycol methacrylate of molecular weight 2,000 g/mole, 33.6% molar of acrylic acid and 39.0% molar of maleic acid, and have a molecular weight of 46,870 g/mole.

The grinding aid agents referenced PP3 consist of a polymer formed by radical polymerisation of 41.3% molar of polyethylene glycol methacrylate of molecular weight 2,000 g/mole and 58.8% molar of maleic acid, and have a molecular weight of 48,000 g/mole.

The grinding aid agents referenced PP4 consist of a polymer formed by radical polymerisation of 15.4% molar of polyethylene glycol methacrylate of molecular weight 5,000 g/mole, 67.0% molar of acrylic acid and 17.6% molar of maleic acid, and have a molecular weight of 36,000 g/mole.

The grinding aid agents referenced PP5 consist of a polymer formed by radical polymerisation of 31.0% molar of polyethylene glycol methacrylate of molecular weight 5,000 g/mole, 33.8% molar of acrylic acid and 35.2% molar of maleic acid, and have a molecular weight of 49,270 g/mole.

The grinding aid agents referenced PP6 consist 46.8% molar of polyethylene glycol methacrylate of molecular weight 5,000 g/mole and 53.2% molar of molar of maleic acid, and have a molecular weight of 44,700 g/mole.

The grinding aid agents referenced PP7 consist of a polymer formed by radical polymerisation of 81.3% by weight of polyethylene glycol methacrylate of molecular weight 2,000 g/mole, and 18.7% by weight of acrylic acid, and have a molecular weight of 35,000 g/mole. The carboxylic groupings of anionic monomers (acrylic acid) are fully neutralised by the sodium.

The grinding aid agents referenced PP8 consist of a polymer formed by radical polymerisation of 84.4% by weight of polyethylene glycol methacrylate of molecular weight 5,000 g/mole, and 15.6% by weight of acrylic acid, and have a molecular weight of 42,000 g/mole. The carboxylic groupings of anionic monomers (acrylic acid) are fully neutralised by the sodium.

The grinding aid agents referenced PP9 consist of a polymer formed by radical polymerisation of 93.2% by weight of a monoether of maleic acid with lateral chains of polyethylene glycol of molecular weight 5,600 g/mole, and 6.8% by weight of maleic acid, and have a molecular weight of approximately 35,000 g/mole.

Before use, the grinding aid agents mentioned above were put into an aqueous suspension such that they represented 60% by weight relative to the total weight of the aqueous suspension, in order to obtain a fluid suspension. The quantity of water thus introduced into the grinding process by means of these suspensions of grinding aid agents was a quantity of water less than 1% by weight relative to the total weight of the material in the grinding enclosure.

Example 1

This example illustrates the improved grinding capacity in a process according to the present invention, using a ball-mill and an Austrian marble, compared with a process not using a dry grinding agent or a dry grinding agent of the prior art.

Before grinding the marble of average diameter 5 cm was previously crushed in a hammer mill.

The distribution of sizes following this crushing stage is given in the table below.

TABLE 1

| Fraction of particles the diameter of which is: | % |
|---|---|
| >1 mm | 17.2 |
| 500 μm-1 mm | 16.5 |
| 200-500 μm | 18.8 |
| 100-200 μm | 12.8 |
| 50-100 μm | 16.3 |
| <50 μm | 18.4 |

This marble was introduced into a "Hosokawa™ Ball Mill S.O. 80/32" sold by the company HOSOKAWA™ (using 100 kg of barrel-shaped grinding balls made of Cylpeb™ iron, having an average diameter of 25 mm), with a view to obtaining a ground material having a median diameter equal to 1.5 μm, and with an air flow rate of 300 m³/hour.

The dry grinding was undertaken continuously.

The outlet of the grinding chamber is fitted with an opening measuring 20×6 mm leading to an Alpine Turboplex™ 100 ATP classifier sold by the company ALPINE™. The classifier is set at 300 m³/hour, although its rotational speed and the airspeed are adjusted in order to obtain a ground material with a diameter less than or equal to a given value (the material ground in this manner is called recovered material); the remaining ground materials of diameter greater than this value are reintroduced into the grinder's feed.

The grinding is undertaken such that 15 kg of the material for grinding is constantly present in the system. Thus, the feed is continuously fed with the quantity of fresh crushed material equal to the quantity of recovered material leaving the system, in order to maintain 15 kg of material in the system.

After starting up the system, and before recording the results indicated below, the system was operated until stable values were obtained for the quantity of ground material able to be used, the grinding capacity and the grinding energy.

The dry grinding aid agents were introduced into the grinding system so as to maintain a constant quantity of grinding aid agents relative to the material for grinding.

TABLE 2

| Test | Type of grinding aid agent | Quantity of grinding aid agent (ppm) | Rotational speed of classifier (rpm) | % of particles with a diameter <2 μm <1 μm | Ground product $d_{50}$ (μm) | Grinding capacity (kg/h) |
|---|---|---|---|---|---|---|
| | | | Invention | | | |
| A | PP6 | 1500 | 10000 | 72/27 | 1.5 | 5.6 |
| B | PP2 | 1500 | 10000 | 66/24 | 1.6 | 6.5 |
| C | PP5 | 1500 | 10000 | 68/25 | 1.5 | 5.5 |
| D | PP1 | 1500 | 10000 | 68/25 | 1.5 | 6.9 |
| E | PP4 | 1500 | 10000 | 68/24 | 1.5 | 5.7 |
| F | PP3 | 1500 | 10000 | 71/27 | 1.5 | 6.6 |
| G | PP7 | 1500 | 10000 | 73/26 | 1.4 | 5.8 |
| H | PP9 | 1500 | 10000 | 70/23 | 1.5 | 5.6 |
| | | | Prior Art | | | |
| I | None | — | 10000 | 72/25 | 1.5 | 3.7 |
| Th | MPG | 1500 | 10000 | 70/26 | 1.5 | 5.2 |
| K | EG | 1500 | 10000 | 69/27 | 1.5 | 5.3 |

The results of table 2 (which are subject to a 10% margin for error) clearly demonstrate that the grinding capacity is improved in the context of the invention.

Example 2

This example illustrates the improved grinding capacity in a process according to the present invention, using a spindle grinder and an Italian marble from South Tyrol, compared with a process using a grinding aid agent of the prior art.

Before the grinding, the marble of median diameter 1 to 10 cm was previously crushed in a hammer mill and sieved at 1 mm in order to recover the fraction having a diameter greater than 1 mm for the grinding described below.

The distribution of particle sizes following this crushing stage is given in the table below.

TABLE 3

| Fraction of particles the diameter of which is: | % |
|---|---|
| 2,800 µm-5,000 µm | 15% |
| 1,000 µm-2,800 µm | 80% |
| <1,000 µm | <1% |

2,500 g of the marble of table 3 was treated by the agents indicated below whilst stirring for 2 hours in the presence of the agent in a rotary enclosure, before being manually introduced over a period of 15 minutes into a spindle grinder of the Kolloplex 160 Z type (rotor diameter 16 cm, rotor speed 14,000 rpm) sold by the company HOSOKAWA™. Following the grinding the recovered material is sieved in a 100 micron sieve. The fraction recovered with a diameter less than 100 microns was analysed by Malvern.

In order to illustrate the process according to the invention 500 ppm of a grinding aid agent consisting 50% by weight of PP8 and 50% by weight of PEG 6000 was added to the marble in the form of an aqueous solution comprising 15% by weight of this agent.

In order to illustrate the process according to the prior art 500 ppm of a grinding aid agent consisting of MPG was added to the marble in the form of an aqueous solution comprising 15% by weight of this agent.

The results are given on the table below.

TABLE 4

| Prior Art | | Invention | |
|---|---|---|---|
| 99.1% | <100 µm | 99.5% | <100 µm |
| $d_{90}$ | 39.2 µm | $d_{90}$ | 38.7 µm |
| $d_{50}$ | 15.0 µm | $d_{50}$ | 15.0 µm |
| $d_{10}$ | 2.2 µm | $d_{10}$ | 2.4 µm |

The process according to the invention enables a product to be obtained comparable to the one obtained by a process using an agent of the prior art.

Example 3

The volatility of the different grinding aid agents in different solvents was compared, after storage for 16 hours in a ventilated kiln at 45° C.

In each of the tests 50 mg of the indicated grinding aid agent was introduced into an open bowl and blended with 50 ml of solvent before being introduced into the kiln.

The degree of volatility was determined by measuring the residual weight in each tank after a period of 16 hours, in order to calculate the percentage of loss by weight of the grinding aid agent.

TABLE 5

| Dry grinding aid agent | Volatility in water | Volatility in methanol | Volatility in ethanol |
|---|---|---|---|
| According to the invention | | | |
| PP1/PP2/PP3 | <10% | <10% | <10% |
| PP4/PP5/PP6 | <10% | <10% | |
| 1:1 blend by weight of PP8 and PEG 6000 | <10% | <10% | <10% |
| PP7 | <10% | <10% | <10% |
| According to the prior art | | | |
| MPG | >90% | >90% | |
| EG | >90% | >90% | |

The results of table 5 demonstrate that the grinding aid agents according to the prior art are more volatile than those used in the process of the invention, despite their low vapour pressure.

Example 4

This example illustrates the improved grinding capacity in a process according to the present invention, using a ball-mill and an Italian marble, compared with a process not using a grinding aid agent.

Before grinding the marble of average diameter 5 cm was previously crushed in a hammer mill.

The distribution of sizes following this crushing stage is given in the table below.

TABLE 6

| Fraction of particles the diameter of which is: | % |
|---|---|
| >1 mm | 30.70 |
| 500 µm-1 mm | 8.40 |
| 200-500 µm | 17.50 |
| 100-200 µm | 19.10 |
| <100 µm | 24.30 |

This marble was introduced into a "Hosokawa™ Ball Mill S.O. 80/32" sold by the company HOSOKAWA™ (using 100 kg of barrel-shaped grinding balls made of Cylpeb™ iron, having an average diameter of 25 mm), with a view to obtaining a ground material having a median diameter equal to 3.0 µm, and with an air flow rate of 300 m³/hour.

The dry grinding was undertaken continuously.

The outlet of the grinding chamber is fitted with an opening measuring 20×6 mm leading to an Alpine Turboplex™ 100 ATP classifier sold by the company ALPINE™. The classifier is set at 300 m³/hour, although its rotational speed and the airspeed are adjusted in order to obtain a ground material with a diameter less than or equal to a given value (the material ground in this manner is called recovered material); the remaining ground materials of diameter greater than this value are reintroduced into the grinder's feed.

The grinding is undertaken such that 15 kg of the material for grinding is constantly present in the system. Thus, the feed is continuously fed with the quantity of fresh crushed material equal to the quantity of recovered material leaving the system, in order to maintain 15 kg of material in the system. The duration of the test is equal to 6 hours.

The dry grinding aid agent was introduced into the grinding system so as to maintain a constant quantity of grinding aid agent relative to the material for grinding.

This grinding aid agent, referenced PP 10, consists of a polymer formed by radical copolymerisation of 25.0% by weight of polyethylene glycol methacrylate of molecular weight 1,100 g/mole functionalised by a hexyl 1-decanyl hydrophobic R' radical, and of 75.0% by weight of acrylic acid, and has an approximate molecular weight of 35,000 g/mole. The carboxylic groupings of the anionic monomer (acrylic acid) are fully neutralised by the sodium.

TABLE 7

| Test | Type of grinding aid agent | Grinding aid agent (molecular weight g/mol) | Quantity of grinding aid agent (ppm) | Rotational speed of classifier (rpm) | Ground product $d_{50}$ (μm) | Average grinding capacity (kg/h) |
|---|---|---|---|---|---|---|
| According to the invention | | | | | | |
| M Control | PP10 | 35 000 | 1500 | 7000 | 2.91 | 5.04 |
| M | None | — | 0 | 7000 | 3.00 | <1.0 |

The results of table 7 (which are subject to a 10% margin for error) clearly demonstrate that the grinding capacity is improved in the context of the invention.

Example 5

This example illustrates the use of calcium carbonate dry ground according to the invention, in a wet grinding process.

To accomplish this an aqueous suspension is prepared consisting 75% of dry calcium carbonate matter, through the suspension in water of 5 kg of dry calcium carbonate obtained according to example 4 in the presence of 0.8% by dry weight of a polyacrylic acid salt (sodium/magnesium ratio=1:1 calculated according to the carboxylic groups) of molecular weight Mw of the order of 6,000 Dalton and of polydispersity equal to 2.5.

This aqueous suspension of calcium carbonate was then circulated in a ball-mill of type Dynomill® of the company Firma Bachhofen (Switzerland) such that 90% by weight of the particles of the aqueous suspension obtained have a spherical diameter equal to 2 micrometres. The grinding balls used are balls of zirconium oxide stabilised with yttrium and have a diameter of between 0.5 and 1.5 mm.

The aqueous suspension of calcium carbonate obtained then has the following characteristics:
Distribution of the sizes of the particles determined using a Sédigraph® 5100 of the company Micromeritics: 89% by weight<2 micrometres, 62% by weight<1 micrometre, 18% by weight<0.2 micrometre.
Brookfield viscosity (Brookfield viscometer type RVT mobile 3) at 100 rpm: 1710 mPas after 1 minute's measurement at a concentration by dry weight of 75.5%,
Brookfield viscosity (Brookfield viscometer type RVT mobile 3) at 100 rpm: 715 mPas after 1 minute's measurement at a concentration by dry weight of 71.9%.

This example shows that a grinding in a wet medium using a dry calcium carbonate obtained by the process according to the invention is possible even at a high solid concentration (>73%) corresponding to a concentration of calcium carbonate in the aqueous suspension higher than 50% by volume of suspension.

The invention claimed is:

1. A product obtained by the process of dry grinding a mineral material comprising at least calcium carbonate, wherein the process comprises the stages of:
a) crushing the mineral material in at least one crushing unit until a crushed material is obtained with a $d_{95}$ of less than 10 cm;
b) optionally subjecting the material crushed according to stage a) to a flotation stage and/or a magnetic separation stage and/or a sieving stage and/or a chemical treatment stage;
c) dry grinding the material according to stage a) and/or b) in at least one grinding unit:
(i) in the presence of a grinding aid agent having a weight-average molecular weight (Mw) of 20,000 to 50,000, wherein the grinding aid agent comprises a polymer formed by radical polymerization of: (a) polyethylene glycol methacrylate, acrylic acid and maleic acid; (b) polyethylene glycol methacrylate and maleic acid; (c) polyethylene glycol methacrylate and acrylic acid in which the carboxylic acid groupings of acrylic acid are fully neutralized by sodium; (d) a monoether of maleic acid with lateral chains of polyethylene glycol methacrylate, and maleic acid; or (e) polyethylene glycol methacrylate functionalized with hexyl 1-decanyl and acrylic acid in which the carboxylic acid groups of acrylic acid are fully neutralized by sodium;
(ii) in such a manner that the quantity of liquid in the grinding unit is less than 15% by dry weight of the material crushed in the crushing unit;
d) optionally classifying the material dry ground according to stage c) with at least one classification unit; and
e) optionally repeating stages c) and/or d) on all or part of the dry ground material resulting from stages c) and/or d);
wherein the material recovered following stage c), and stage d) if performed, and stage e) if performed, has a $d_{50}$ of 0.5 to 500 microns and comprises said grinding aid agent.

2. The product according to claim 1, wherein step c) is performed in the presence of 0.005 to 1.0% by dry weight of the grinding aid agent, relative to the dry weight of the material crushed in each grinding unit.

3. The product according to claim 1, wherein step c) is performed in the presence of 0.03 to 0.5% by dry weight of the grinding aid agent, relative to the dry weight of the material crushed in each grinding unit.

4. The product according to claim 1, wherein the grinding aid agent used in stage c) is blended with another agent.

5. The product according to claim 4, wherein the other agent is a carbohydrate, a polyethylene glycol (PEG), tri isopropanol amine (TIPA), or their blends.

6. The product according to claim 1, wherein the grinding aid agent used in stage c) is blended with a polyethylene glycol (PEG) in a ratio PEG: grinding aid agent equal to 50:50.

7. The product according to claim 1, wherein the grinding aid agent used in stage c) is blended with tri isopropanol amine (TIPA) in a ratio TIPA: grinding aid agent equal to 20:80.

8. The product according to claim 1, wherein the mineral matter is calcium carbonate comprising limestone, marble, chalk, dolomite or any blend thereof.

9. The product according to claim 1, wherein the mineral matter comprises calcium carbonate and one or more of a clay, bentonite, a kaolin, a feldspar, a calcinated clay, a non-clayey silicate, a talc, a mica or any blend thereof.

10. The product according to claim 1, wherein in stage c), the liquid content in the grinding unit is less than 10% relative to the total dry weight of the material for grinding in the said grinding unit.

11. The product according to claim 1, wherein in stage c), the liquid content in the grinding unit is less than 5% relative to the total dry weight of the material for grinding in the said grinding unit.

12. The product according to claim 1, wherein in stage c), the liquid content in the grinding unit is less than 1% relative to the total dry weight of the material for grinding in the said grinding unit.

13. The product according to claim 1, wherein stage d) takes place.

14. The product according to claim 13, wherein the classified material resulting from stage d) has a $d_{50}$ (average diameter) of between 0.7 and 150 microns.

15. The product according to claim 13, wherein the classified material resulting from stage d) has a $d_{50}$ (average diameter) of between 1 and 45 microns.

16. The product according to claim 13, wherein the classified material resulting from stage d) has a $d_{50}$ (average diameter) of between 1.2 and 5 microns.

* * * * *